United States Patent
Fautier et al.

[11] Patent Number: 5,561,465
[45] Date of Patent: Oct. 1, 1996

[54] VIDEO DECODER WITH FIVE PAGE MEMORY FOR DECODING OF INTRAFRAMES, PREDICTED FRAMES AND BIDIRECTIONAL FRAMES

[75] Inventors: Thierry Fautier; David Molter, both of Paris, France

[73] Assignee: U.S. Philips Corporation, New York, N.Y.

[21] Appl. No.: 221,148

[22] Filed: Mar. 30, 1994

[30] Foreign Application Priority Data

Mar. 31, 1993 [FR] France ................................. 93 03778

[51] Int. Cl.⁶ ..................................................... H04N 7/32
[52] U.S. Cl. ............................................................ 348/415
[58] Field of Search ....................................... 348/416, 415, 348/409, 402, 401, 400, 390, 384

[56] References Cited

U.S. PATENT DOCUMENTS

| | | | |
|---|---|---|---|
| 5,168,356 | 12/1992 | Acampora et al. | 348/384 |
| 5,175,618 | 12/1992 | Ueda et al. | 348/416 |
| 5,293,229 | 3/1994 | Iu | 348/384 |
| 5,317,397 | 5/1994 | Odaka et al. | 348/416 |
| 5,386,234 | 1/1995 | Veltman et al. | 348/415 |

*Primary Examiner*—Tommy P. Chin
*Assistant Examiner*—Bryan S. Tung
*Attorney, Agent, or Firm*—Laurie E. Gathman; Leroy Eason

[57] ABSTRACT

Compression algorithms for digital video signals are based on processing of data blocks of frames which are of three types, i.e. intraframes, predicted frames, and interpolated or bidirectional frames (B). The memory space of the decoder is arranged in the form of five pages, four pages of which are used for each storing a field of the intraframe or predicted type. The fifth page is divided into sections each of which can store a line of blocks of a field of a bidirectional frame B. The bidirectional frames are decoded in successive stages of one line of blocks at a time, and the lines of blocks which are being decoded are stored progressively each time at the address in memory of a line of blocks the contents of which have already been displayed. The necessary memory space of the decoder is thereby reduced from six pages to five pages.

8 Claims, 4 Drawing Sheets

VIDEO DECODER WITH FIVE PAGE MEMORY FOR DECODING OF INTRAFRAMES, PREDICTED FRAMES AND BIDIRECTIONAL FRAMES

BACKGROUND OF THE INVENTION

The invention relates to a method of decoding frames which have been encoded digitally while using compression, in which the number of pixels to be treated per unit of time is fixed and a frame is divided into blocks, each block comprising several pixels in both the horizontal and vertical direction, the compression being based on processing of blocks transmitted sequentially. Each frame is formed of two fields and may be any of at least three types, viz. of the intraframe type, encoded in its own absolute values, i.e. without reference to other frames; predicted-type frames encoded with reference to a preceding frame whisk may be an intraframe or predicted frame; and frames of the bidirectional type encoded with reference to at least two other frames which are each intraframes or predicted frames. Certain pains of an intraframe or predicted frame and a frame of the bidirectional type are such that the intraframe or predicted frame serves for coding or decoding of the frame of the bidirectional type which must be displayed prior thereto, requiring a memory space for storing the frames which have just been decoded or are being decoded. The invention also relates to a device for performing this method. The invention is applicable to the digital television of standard definition or high definition.

The compression algorithms for frames having a low rate use temporal treatments which necessitate a considerable memory capacity. Known systems make use of memory control at the level of the frame. However, the use of this method is limited because the memory size required for this control makes use of an excessively large number of memory units.

SUMMARY OF THE INVENTION

The invention utilizes the fact that the number of pixels to be treated per unit of time is fixed. A direct consequence is that the number of pixels to be coded in a frame, and consequently the number of memory words required for storing the frames is limited, and the algorithms for compression of the frames are based on a processing of blocks which are transmitted sequentially. The invention also utilizes the fact that the frame compression algorithms act on frames constituted by 2 fields (even and odd).

The invention provides an economic method, at an average cost of the decoder and the memory, by which the decoded frames can be stored in a memory having a minimum size, without excessively complicating the memory control by taking advantage of the types of available memories. Thus it avoids the problem of an excessive number of memory units for storing the decoded frames.

This object is achieved in that the memory storage space is arranged in the form of five pages, four pages of which are used for storing a field of the intraframe type or of the predicted type each and the fifth page is divided into sections each having storage capacity for an entire part of a field. The page sections each store a part of a field of a frame of the bidirectional type, said part representing a horizontal band having the same width as that of the frame. The frames of the bidirectional type are decoded in successive stages of a part of the field or frame at a time. The parts which have just been decoded or are being decoded are located progressively each time at the address, in the fifth page, of a section whose contents have already been displayed.

A good compromise for the width of the sections is obtained when said sections are "line-of-block" zones each having a capacity of one line of block (i.e. the quantity of block which, side by side, occupy the length of a frame line), and with the frames of the bidirectional type being decoded in successive stages of one line of blocks at a time. The lines of blocks which have just been decoded or are being decoded are located progressively each time at the address, in the fifth page, of a line-of-block zone whose contents have already been displayed.

Thus, during decoding of images having a standard quality of 25 frames per second, it is possible to locate all the pages in one and the same memory unit having a capacity of 16 megabits, while the frames received for decoding are also located in the remaining part of the memory in the same unit.

A sectional control is advantageously effected for intraframes or predicted frames, for which control each section which stores a part of the field is re-allocated for storing a part of the next field which has just been decoded or is being decoded after the contents of this section have already been displayed and if it is no longer used as a reference for motion compensations.

The invention is based on the recognition that whereas the intraframes and predicted frames need to be completely stored per field, both in luminance and in chrominance, the bidirectional frames can be stored as lines of blocks, in luminance and in chrominance. This arrangement is feasible because motion compensation for all the fields is effected on the basis of the I or P fields and the amplitude of the motion vectors is not limited.

In the case of decoding images of the standard quality of 25 frames per second, which are intraframes, the number of delay fields between the start of decoding a field and the start of its display is preferably three, while in the case of 24 frames per second which must be displayed at 60 fields per second, the number of delay fields between the start of decoding a field and the start of its display is preferably four.

A device for performing the above-mentioned method is characterized in that it comprises a memory divided into four pages which are capable of containing a field each, and a fifth page divided into sections (a section may contain a complete part of a field) and having a size which can contain the size of a field plus two sections. The device also comprises a control element for controlling display of decoded parts of the field or the frame for frames of the bidirectional type, so as to reallocate each section in order to register with a part of the field which has just been decoded or is being decoded after the contents of this section have already been displayed, and for applying the memory addresses to the decoding element, at which addresses the start of each part of the field or the frame which has just been decoded or is being decoded is written.

Advantageously, section control means are also provides for pages one to four, by which each section is reallocated to store a new part of the field which has just been decoded or is being decoded if the contents of this section have already been displayed and if it is no longer used as a reference for the motion compensations.

These and other aspects of the invention will be apparent from and elucidated with reference to the embodiments described hereinafter.

DETAILED DESCRIPTION OF PREFERRED EMBODIMENTS OF THE INVENTION

Although the invention relates to the decoding process, a preliminary description of the encoding process will provide a better comprehension of the decoding method and device.

The compression algorithms for the animated images make use of special treatments (discrete cosine transform, adaptive quantization, entropy encoding) and temporal treatment (motion compensation, temporal interpolation).

Frames of three types are defined:

frames referred to as I ("intra") encoded without reference to other frames, frames referred to as P ("predicted"), encoded with reference to the preceding frame which itself is of the type I or P, frames referred to as B, ("bidirectionally interpolated"), i.e. with respect to a frame I or P which it precedes and a frame I or P which it follows.

The predictions used for the frames B are always produced from the adjacent I or P frames. Thus, the I and P frames play a particular role because they serve as reference frames for the motion compensations.

An example of the sequence of frames produced by encoding is the following, the upper line indicating the type of frame, I, P or B which is produced by the encoder from the received frames, all of which have been defined without reference to other frames before encoding, and the, lower line indicating the order of arrival of these frames:

type: I B B P B B P B B . . . order of arrival: 0 1 2 3 4 5 6 7 8 . . .

Figure 1:
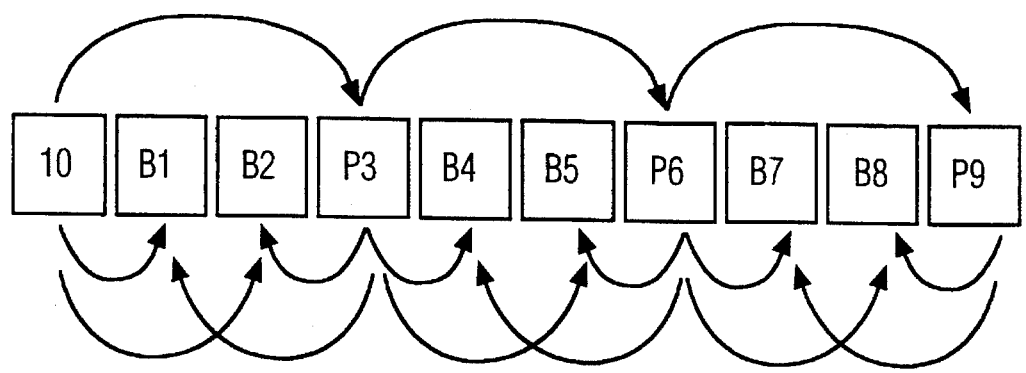
FIG. 1 illustrates the encoding of the frames relative to one another.

FIG. 1 illustrates the frames from which the others are generated. The frame P3 is generated from frame I0, the frames B1 and B2 are generated from the frames I0 and P3, the frame P6 is generated from frame P3, the frames B4 and B5 are generated from frames P3 and P6, the frame P9 is generated from frame P6, the frames B7 and B8 are generated from frames P6 and P9, etc.

The third frame P3 is created in the encoder from the first frame I0, so that it leaves the encoder after the last-mentioned frame. The first and second frames of the type B are created from the frames I0 and P3 so that they leave the encoder after them, the frame P6 is created from the frame P3, and so forth, Consequently the frames of the above-mentioned example leave the encoder (and thus arrive at the decoder) in the following order:

type: I P B B P B B . . . corresponding to the initial order of arrival: 0 3 1 2 6 4 5 . . .

The horizontal and vertical dimensions of a frame are referred to as DIMH and DIMV. The encoding mode may be either the frame mode, in which case the frame is applied in the form of a table having a format of DIMH×DIMV, or in the field mode, in which case the frame is applied in the form of two successive fields of the dimension DIMH×DIMV/2. Each frame (or field) is divided into blocks whose horizontal and vertical dimensions are H and V, respectively. As usual, H and V have values of 8 pixels or 16 pixels.

As far as decoding is concerned, the order of display of the frames on the screen, i.e. the order of leaving the decoder must be the same as the order of arriving at the encoder:

type: I B B P B B P . . . leaving order: 0 1 2 3 4 5 6 . .

The display is always effected field by field and is based on lines.

When a predictive and interpolating encoding mode is used (frames B) the frames much be rearranged at the level of the decoder, which necessitates a particular control of the memory.

Figure 2:
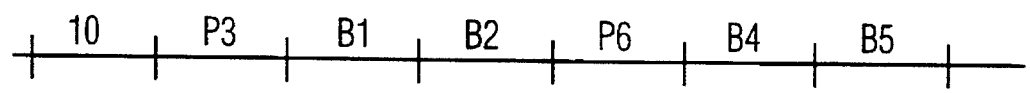
FIG. 2 shows a time diagram in a prior-art method.
Figure 2:
Figure 2:
Figure 2:
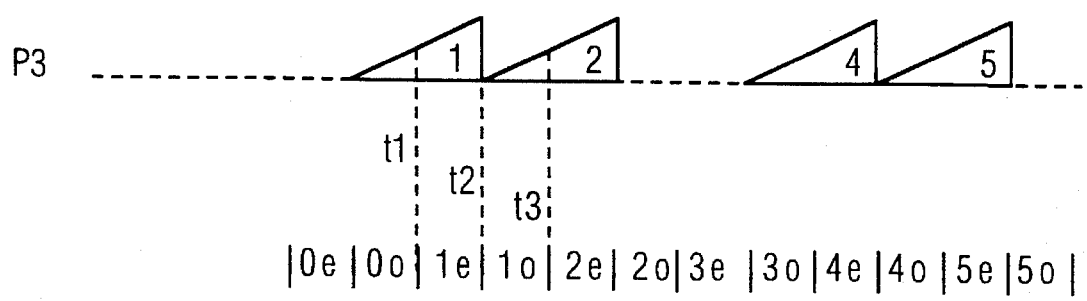

FIG. 2 illustrates an example of the memory control of frames in a decoder of the prior art, using 3 memory pages denoted P1, P2, P3, respectively, of which each page can contain a frame. At the top of the Figure it is indicated which frames arrive at the decoder: the order is the same as indicated above for frames leaving the encode (I0, P3, B1 etc.). The slopes of the triangles indicate the decoding progression and the corresponding filling of the page. Dependent on its decoding, frame I0 is located in page P1 (triangle 0). Dependent on its decoding, frame P3 is located in page P2 (triangle 3). Subsequently frame P6 will be inscribed in page P1 and so forth, one frame I or P out of two being written in P1 and the other in P2. Dependent on its decoding, frame B1 is located in page P3 (triangle 1). The display time of the frames is indicated at the bottom of the Figure. Each frame is displayed in the form of two fields, thus the frame 0 is shown in an even field (0e) and an odd (0o) field, respectively. Subsequently frame 1 is shown in an even field (1e) and an odd field (1o), respectively, and so forth. A display start time can be set (time t1) for decoding the bidirectional frames, when half the decoding time of the frame B1 has elapsed (i.e. when its first field is decoded if the frame is coded in the field mode, or when the upper half of the frame, which is made of even half field and an odd half field, is decoded if the frame is coded in the frame mode). After the field 1e has been displayed it is no longer necessary to be retained and so a part of the page P3 is thus already available (time t2). This part of the page P3 is used as well as the part which empties during display of the field 1o (between the times t2 and t3) for writing the frame B2 (triangle 2), so that a start can be made during the display when half the decoding time of this frame B2 has elapsed (time t3), and so forth. This does not require a particular control of the page P3 because the new bidirectional frame is rewritten at the same addresses as that preceding this image.

In the inventive method two reference frames are stored, which corresponds to four pages each containing a field, denoted P1, P2, P3, P4, used for storing the fields I or P, and the lines of block are stored in a page denoted PB which is divided into "line-of-block" zones and which contains the lines of the blocks of the decoded frames B. A memory space which can contain a line of block from a field, i.e. which contains V lines of each DIMH pixel for the luminance is referred to as line-of-block zone. Such a space contains, for example 720×16 pixels in the standard definition. It is supposed that the decoding time of a frame, denoted as Tdec, is at most equal to Tframe, Tframe being equal to 40 ms in a 50 Hz system or 33 ms in a 60 Hz system. The decoding duration of a line of blocks depends on the contents of the frame to be encoded and is limited. The decoding time of a line of blocks consequently follows a complex rule of probability. The decoding time is supposed to be linear, i.e. the duration of decoding of a line of blocks is substantially equal to (V/DIMV)*Tdec. However, according to the invention devices are used which are necessary for the cases where decoding is performed in advance or afterwards with respect to the model used.

Figure 3:
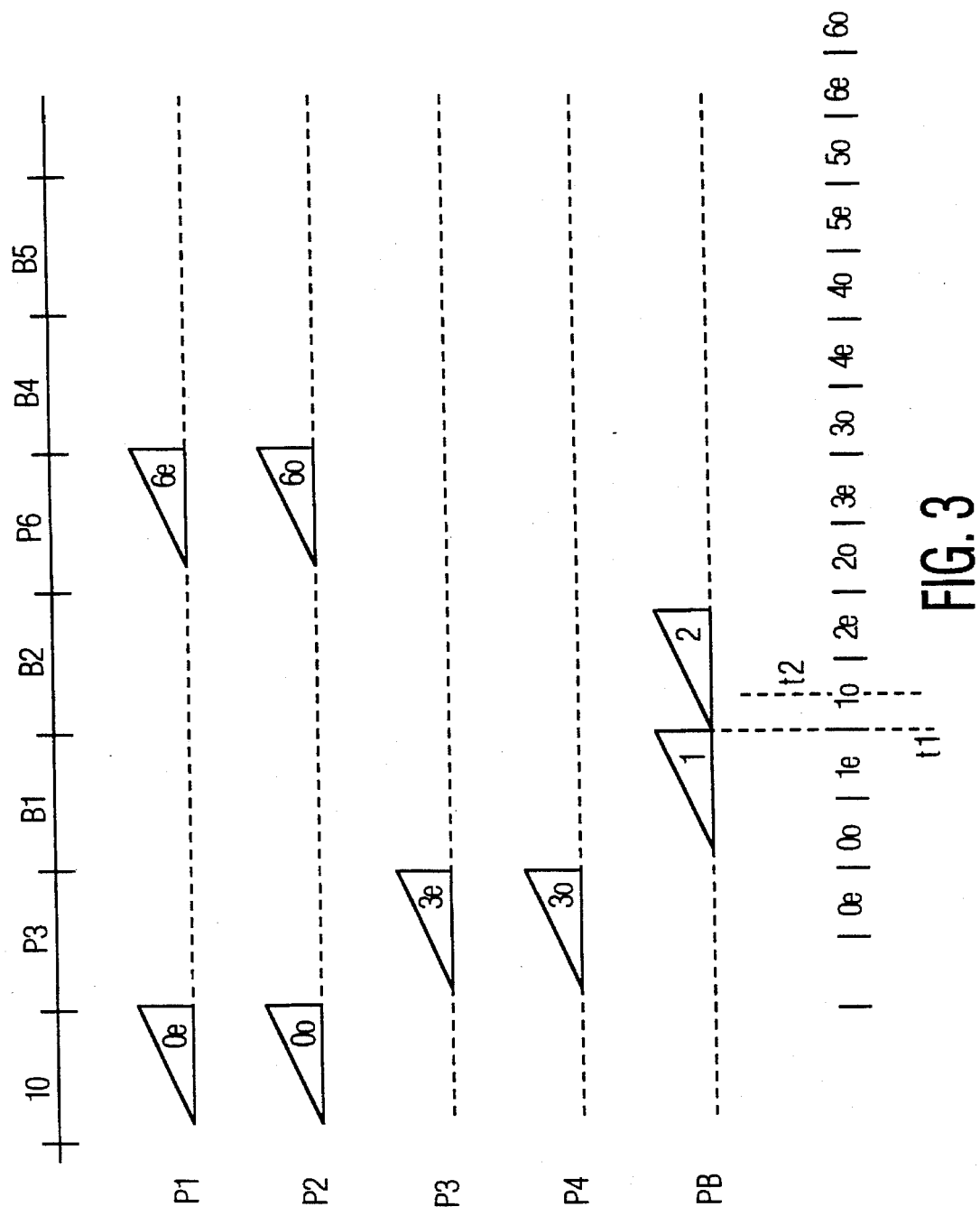
FIG. 3 is a time diagram in the method according to the invention.

The temporal diagram of the decoding procedure is shown in FIG. 3. This sequence corresponds to the case where the frames are displayed at double the rate at which they are decoded. This corresponds to coding at 30 Hz and display at 60 Hz, or to coding at 25 Hz and display at 50 Hz. The case where the rhythms of coding and display are different will be dealt with hereinafter.

From the time t1 in FIG. 3, page PB contains the odd field of B1. Nevertheless the frame B2 can be written, provided that the size of the page PB is larger than the size of a field plus the size of a line of blocks in the case of field coding and two lines of blocks in the case of frame coding. The minimum memory size "TailleminE" of page PB is: $TailleminE = (DIMH \times DIMV/2) + (2 \times V \times DIMH)$.

This process provides a greater flexibility in the control of the memory with respect to the known system which is based on a memory control at the level of the frame or the field. In FIG. 3, between the start and the finish of display of the even field B1, DIMV/2×V line-of-block zones have been released by the display process. During this period these memory zones may be utilized in the decoding process for storing the second part of the decoded frame B 1.

Figure 4:
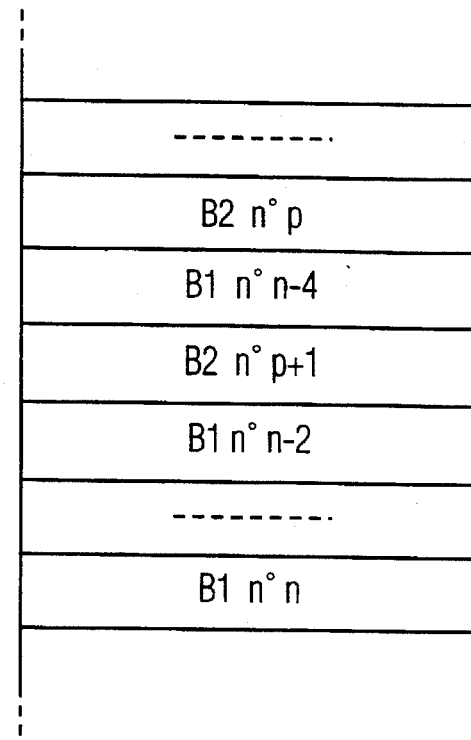
FIG. 4 illustrates the control of a part of a memory page containing the lines of blocks of type B frames.

FIG. 4 shows a state of a part of the page PB, with each rectangle representing a line-of-block zone. The state at the instant t2 in FIG. 3 is concerned, i.e. when half the odd frame 1o is displayed. For example, the indication "B2 no. p+1" denotes that the line-of-block zone in question contains the line of blocks of number "p+1" of frame B, field number 2. A line of blocks "B1 no. n−6" located before B2 no. p has already been displayed and the memory zone ( - - - ) is thus free. Similarly a line of blocks between "B1 no. n−2" and "B1 no. n" has already been displayed and the memory zone is thus free.

With this type of control a memory space between the minimum size (DIMH×DIMV/2)+(2×V×DIMH) and the maximum size DIMH×DIMV can be used for the page PB.

For a system where the decoding time is linear, the necessary size for the page PB is ⅔×DIMH×DIMV.

The principle described above is similarly applicable to a 60 Hz system, while the pages P1, P2, P3, P4, PB are always arranged in lines of blocks. However, in the case of a 60 Hz system a decoder should be capable of decoding a sequence encoded at 30 or 60 Hz and also a film sequence encoded at 24 Hz (whereas in a 50 Hz system all the sequences are encoded at 25 or 50 Hz).

Figure 5:
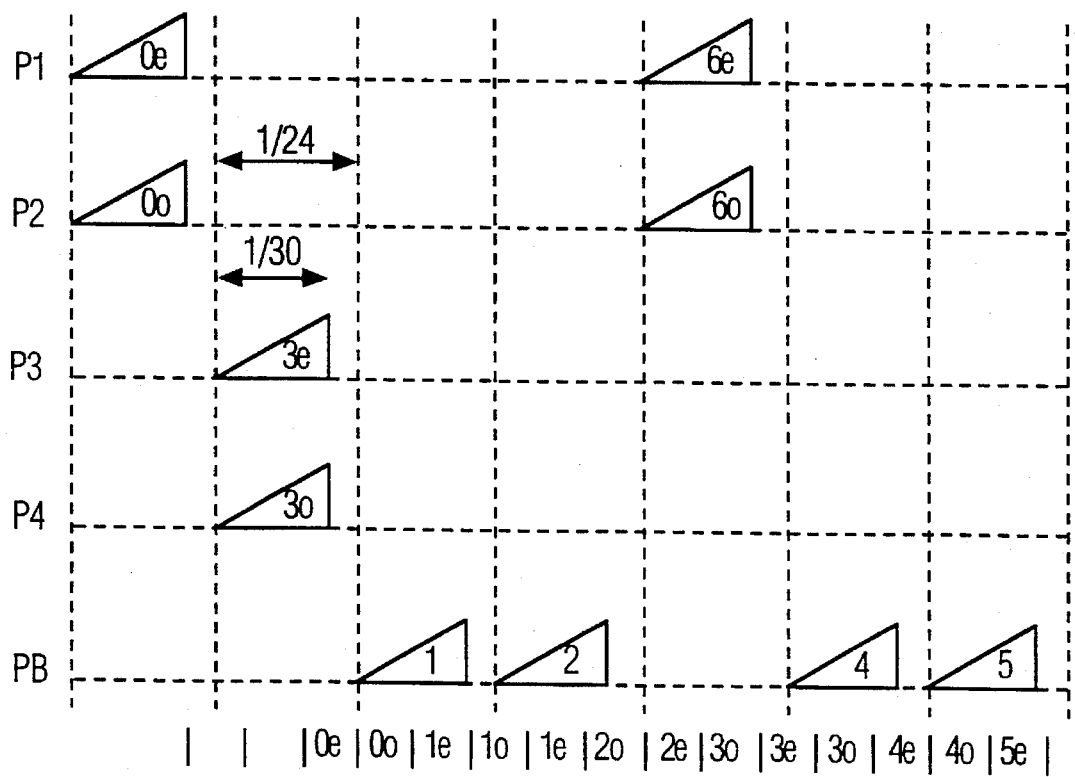
FIG. 5 is a time diagram in the method according to the invention in the case of cinema images of 24 frames per second to be displayed in the form of 60 fields per second.

FIG. 5 shows the sequence of decoding at 24 Hz and field display at 60 Hz. As the frames must be presented at 30 Hz, the decoded frames only last 1/30 second. On the other hand, the encoding frequency is 24 Hz, i.e. the frames to be decoded arrive every 1/24 second. For obtaining a display frequency which is larger than the number of available frames, a field is displayed twice every two frames (here: 1e displayed again after 1o, 3o displayed again after 3e, etc. Moreover, because this 2nd supplementary field 1e is even, the next field should be odd, which leads to a subsequent display of 2o instead of 2e). A 60 Hz decoder should be capable of decoding a succession of sequences encoded either at 30 Hz or at 24 Hz and the number of delay fields between display and decoding should be constant. Consequently, at 60 Hz the delay between decoding and display is always fixed at four fields. This constitutes a considerable difference with respect to a 50 Hz system in which the number of delay fields between the first decoded field and the first displayed field is three.

In the case of decoding a sequence encoded at 30 Hz and displayed at 60 Hz, i.e. decoding at 60 Hz, in order that the start of decoding the frame 2 is not delayed, the page PB must contain a complete frame (for storing the complete frame B1) and two lines of blocks for storing the first line of blocks obtained from decoding the frame B2. The minimum size at 60 Hz for E is (DIMH×DIMV)+(2×V×DIMH).

Figure 6:
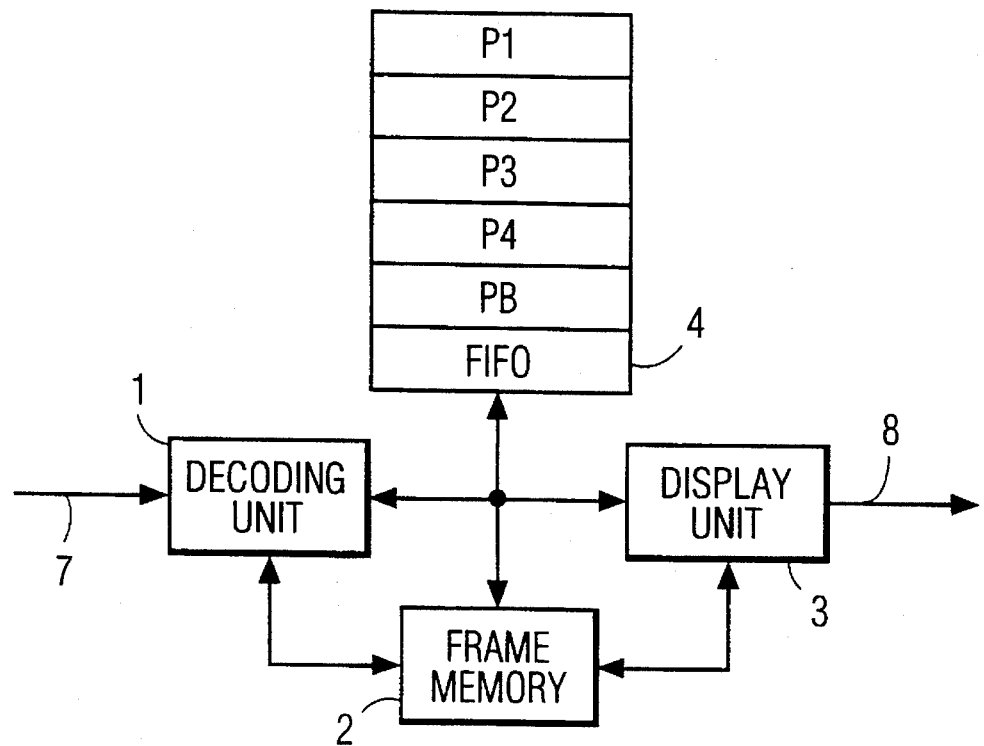
FIG. 6 shows diagrammatically the division of a decompression and decoding device according to the invention, with a memory divided into pages P1 to P4 and PB.

FIG. 6 shows the division of a system for decompressing and decoding animated images according to the invention. It is functionally divided into four elements:

- a memory 4 divided into four pages P1, P2, P3, P4 used for containing an intrafield or predicted field each, and a fifth page PB which is divided into zones referred to as line-of-block zones which are used for storing a line of blocks of a bidirectional frame each. The memory 4 also comprises a zone denoted "FIFO" which is used for storing the frames received by the decoder.
- a decoding unit 1 for decoding and decompressing frames received in a compressed form by a conductor 7, and for writing into the external memory 4,
- a display unit 3 which reads the decoded frames from the external memory for supplying them via a conductor 8 to an arbitrary display device (not shown) in synchronism with the video synchronizing signals,
- a control unit of the frame memory 2, with which the invention can be carried into effect.

The control unit of the frame memory 2 applies to the decoding unit 1:

the memory addresses at which the start of each line of block of the frame during decoding is written, the memory addresses of the prediction fields used for the motion compensations (past and future references).

For frames of the type B the control unit functions on the basis of the following rule: every zone used by a line of block may be reallocated for storing a line of blocks during decoding if its contents have already been displayed. Such a control of the memory is well known in the field of informatics and a description with reference to its function is thus sufficient to those skilled in the art.

For each new line of block during decoding from a frame B, the control unit of the frame memory 2 allocates two lines of block in the case of frame coding and one line of block in the case of field coding. If no memory line of block is available, the decoding process is stopped until two lines of blocks are available in page PB. This situation may arise when the frames B are very strongly compressed, in which case the decoding process may be realised more rapidly than in the case where a DCT decoding and "demi-pixel" motion compensations (i.e. interpolations between two pixels) have to be performed. This case may be avoided by reserving, at the start, a more significant zone for the page PB. The control unit of the frame memory 2 is also charged for each new decoded frame I or P with the allocation of two memory zones containing fields which have already been displayed for storing the frame to be decoded. If the frame contained in a field zone is being displayed, a control at the level of the lines of block may also be effected by the control unit for the frame memory for the frames I or P (in addition to that realised for the frames B). The control unit of the frame memory 2 then functions in accordance with the following rule: every zone utilized by a field or line of blocks may be reallocated for storing a field or line of blocks of the same type during decoding if its contents have already been displayed and if it is no longer used as a reference for the motion compensations. Thus, if the line of blocks number "n" of a field memory is completely displayed, it can be used for storing the line of blocks number "p" (with p<n) of the frame I or P during decoding if no other field memory is available. Thus, for example in the case of a purely predictive encoding procedure (i.e. without frames of the type B, while the frames P are received by the decoder in a rhythm which is higher than in the case where the frames B are inserted between the frames P), the memory P1 or the memory P3 arranged in lines of blocks may contain the lower half of an even field in their lower part and the start of the next even field in their upper part, and similarly the memories P2 and P4, arranged in lines of blocks, may contain the lower half of an odd field in their lower part and the start of the next even field in their upper part.

The control unit of the frame memory 2 applies to the display unit the memory addresses corresponding to the start of each line of blocks of the frame during display. Upon each request by the display unit, which is effected every V display lines, the control unit of the frame memory 2 supplies the external memory address at which the start of the line of blocks to be displayed is situated.

As the display process must have precedence over the memory, it must never be effected in anticipation of the data necessary for display, except when the decoding process should be interrupted by a default of compressed data at the input of the decoding process. The display process releases the memory per line-of-block zone which are subsequently reallocated by the control unit of the frame memory 2 for storing the lines of blocks during decoding.

Figure 7:
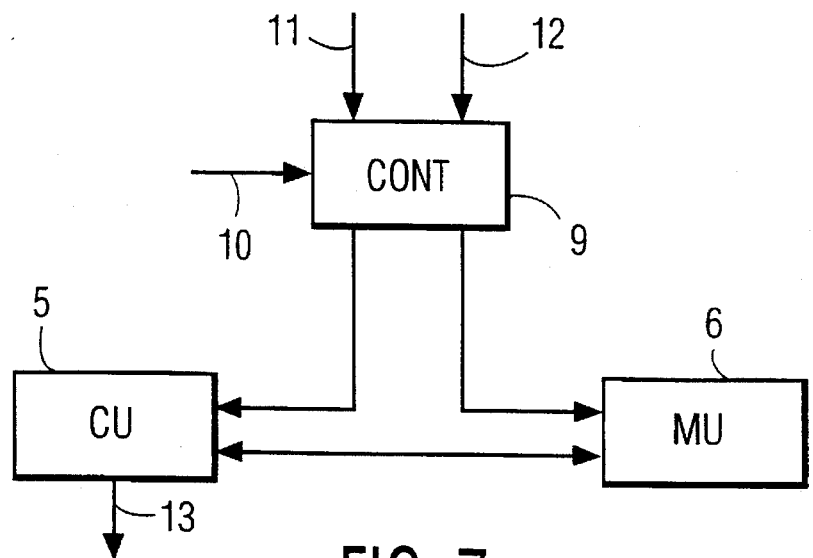
FIG. 7 shows diagrammatically the structure of the element 2 of FIG. 6.

FIG. 7 shows the internal functional division of the control unit of the frame memory 2 of FIG. 6. This unit is constituted by three modules: a control module 9, a "memory module" module 6 and a "computation unit" module 5. The control unit 9 receives from the decoding unit 1, v/a a conductor 10, the information from the binary series corresponding to the characteristics of the decoded frame, notably:

the type of frame, the type of coding, the type of sub-sampling of the chrominance.

It also receives from the decoding unit, via a conductor 11, the memory allocation requests for the next line of blocks to be decoded.

Upon each request of the memory address from the decoding unit, the control module 9 will search the memory unit 6 which contains the information relating to each line of blocks present in the external memory. If no line-of-block zone is available, the decoding operation is stopped in anticipation of clearing the memory space corresponding to the line of blocks to be memorized. If a line of blocks zone is available, the memory unit 6 provides an index for the computation unit 5 which will generate the corresponding memory address in the external memory 4 and will supply it to a conductor 13. This address is subsequently applied by the computation unit 13 to the decoding unit 1. The display unit 3 requests the control module 9, via a conductor 12, for the memory address at which the next line of blocks to be displayed should be read by the display unit from the external memory 4.

Upon each request for a memory address from the display unit, the control module 9 will search the memory unit 6 which will supply an index to the control module which index will be decoded for furnishing the external memory address. If this address is not available, in other words if the decoding process is not effected correctly, the control unit 2 of the frame memory 4 supplies the display unit 3 with addresses of the line-of-block memory zones associated with the last frame I or P available in the memory with a view to furnishing a frame which is close enough to the frame which is displayed normally.

The memory unit 6 is constituted by a memory and an address generator. As the number of lines of blocks stored in the memory is limited, the index of the line of blocks in the external memory is used as an address for the memory of the memory unit 6. The data associated with this address are constituted by two fields:

data: corresponding to the index of the line of blocks in the frame control: containing all the control information associated with the line of blocks in the memory.

The control module 9 always works in anticipation with respect to the requests of the decoding unit 1 and the display unit 3. During decoding (or displaying) the line of blocks number "n", it computes the memory address at which the line of blocks number "n+1" must be written (or read, respectively).

As the control of the memory is effected for the frames B on the basis of the lines of block, the memory extension is realised per line of blocks, which corresponds to small memory increments. On the other hand tests on the sequences of frames may be realised with different values of Tdec and TailleminE without a priori knowing an exact limit for the decoding time Tdec in order to find the couple of optimal values for Tdec and TailleminE.

On the other hand, if the memory size allocated to the lines of blocks for the frames B is fixed, the operating frequency of the decoding system can be determined so that this will result in the Tdec value which meets the limitations imposed by the memory size allocated for storing the lines of blocks of the frames B.

The invention is particularly useful in a 50 Hz system where a memory control per frame leads to storing three frames for a sub-sampling format of a factor of two, horizontally and vertically for the chrominance, 3×720×576×12 is 14.93 10E6 bits. If a system for decoding frames is to be constructed with 16 Mbits of DRAM, there are only 1,847 10E6 bits available for storing the compressed frames, corresponding to an equivalent rate of approximately 7.4 10E6 bits/s.

The invention uses only 14.197 10E06 bits for the pixel memory part and consequently 2.58 10E6 bits can be used in a 16 Mbit memory system for storing the compressed frames, which corresponds to a rate of approximately 10.4 10E6 bits/s.

The memory gain in using the invention corresponds to 733 10E3 bits with which rates that are 40% higher with respect to a conventional memory control system can be addressed.

We claim:

1. A method of decoding and displaying video frames which have been digitally encoded including compression; each frame being represented by a series of sequential data blocks which each correspond to a block of pixels in the horizontal and vertical direction; each frame being displayed as two successive fields and being any of three types, the three types being intraframe, predicted frame and bidirectional frame; decoding of certain bidirectional frames requiring display thereof prior to an associated intraframe or predicted frame based on which such decoding is performed; said method comprising:

providing a memory for storing frames which have just been or are being decoded and which is organized as five memory pages, four of said pages each having capacity for storing a field of a frame, the fifth page having capacity for storing a field of a frame and a portion of another field of a frame;

storing in said four pages four fields of frames other than the bidirectional frames;

dividing the fifth page into a plurality of sections, each section storing a predetermined part of a field of a bidirectional frame, said part representing a horizontal band of the same width as said field; and decoding each bidirectional frame in successive stages of part of a field thereof at a time, the field parts which have just been or are being decoded being stored progressively at addresses in said fifth page of sections containing field parts which have already been displayed.

2. A method as claimed in claim 1, wherein said sections of the fifth page are line-of-block zones each having a capacity for storing a line of data blocks corresponding to the width of a field; the bidirectional frames are decoded in successive stages of one line of blocks at a time; and lines of blocks which have just been or are being decoded are stored progressively at addresses in the fifth page of line-of-block zones pertaining to field parts which have already been displayed.

3. A method as claimed in claim 1, further comprising sectional storage of frames other than bidirectional frames; each page of said memory having sections for storing a predetermined part of a field of a frame; a section in which a part of a field is already stored being used for storage of a part of a subsequent field which has just been or is being decoded, after the already stored contents of such section have already been displayed and are no longer needed as a reference for motion compensation.

4. A method as claimed in claim 1, wherein the video frames occur at the rate of 25 frames per second, said memory has a capacity of 16 megabytes, and frames received for decoding are stored in a separate part of said memory from where frames which are being decoded are stored.

5. A method as claimed in claim 1, wherein the video frames occur at the rate of 25 frames per second, and there is a delay interval of three intraframe fields between the start of decoding of an intraframe field and the start of display thereof.

6. A method as claimed in claim 1, wherein the video frames occur at the rate of 24 frames per second and are displayed at 60 fields per second, and there is a delay interval of four intraframe fields between the start of decoding of an intraframe field and the start of display thereof.

7. Apparatus for decoding and displaying video frames which have been digitally encoded including compression; each frame being represented by a series of sequential data blocks which each correspond to a block of pixels in the horizontal and vertical direction; each frame being displayed as two successive fields and being any of three types; the three types being intraframe, predicted frame and bidirectional frame; decoding of certain bidirectional frames requiring display thereof prior to an associated intraframe or predicted frame based on which such decoding is performed; said apparatus comprising a memory for storing frames which have just been or are being decoded, and a decoding unit for decoding frames and writing frames which have just been or are being decoded into said memory; characterized in that:

said memory is organized as five memory pages, four of which are for respectively storing fields of frames other than bidirectional frames, the fifth page being divided into a plurality of sections numbering two more than required for storing a field of a bidirectional frame;

said apparatus further comprises a control unit for controlling display of decoded parts of fields of bidirectional frames, and for allocating parts of fields which have been or are being decoded to sections of the fifth page the contents of which have already been displayed; and said apparatus further comprises means for supplying said decoding unit with memory addresses at which are stored the start of parts of fields which has just been or are being decoded.

8. Apparatus as claimed in claim 7, further comprising section control means for the four memory pages which store fields of intraframes and predicted frames; said section control means allocating sections of said pages to storage of parts of fields which have just been or are being decoded, after the already stored contents of said sections have been displayed and are no longer needed as references for motion compensation.

* * * * *